(12) United States Patent
Haider et al.

(10) Patent No.: US 9,753,525 B2
(45) Date of Patent: Sep. 5, 2017

(54) SYSTEMS AND METHODS FOR CORE DROOP MITIGATION BASED ON LICENSE STATE

(71) Applicant: Intel Corporation, Santa Clara, CA (US)

(72) Inventors: Nazar S. Haider, Fremont, CA (US); Dean Mulla, Saratoga, CA (US); Allen W. Chu, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 197 days.

(21) Appl. No.: 14/581,781

(22) Filed: Dec. 23, 2014

(65) Prior Publication Data

US 2016/0179163 A1    Jun. 23, 2016

(51) Int. Cl.
  *G06F 1/32*    (2006.01)
(52) U.S. Cl.
  CPC ........ *G06F 1/3243* (2013.01); *Y02B 60/1239* (2013.01)
(58) Field of Classification Search
  CPC .................................................... G06F 1/3203
  See application file for complete search history.

(56) References Cited

U.S. PATENT DOCUMENTS

| | | | | |
|---|---|---|---|---|
| 6,240,521 B1 * | 5/2001 | Barber | .................. | G06F 1/3203 713/323 |
| 7,178,137 B1 * | 2/2007 | Peak | ........................ | G06F 8/45 717/131 |
| 7,375,443 B2 | 5/2008 | Nguyen et al. | | |
| 2001/0045815 A1 * | 11/2001 | Muratov | .................... | G06F 1/26 323/280 |
| 2009/0063065 A1 * | 3/2009 | Weekly | ...................... | G06F 1/28 702/64 |
| 2009/0063884 A1 * | 3/2009 | Weekly | ................. | G06F 1/3203 713/340 |
| 2010/0229021 A1 | 9/2010 | Konstadinidis et al. | | |
| 2011/0156602 A1 * | 6/2011 | Liang | ................. | H05B 33/0806 315/185 R |
| 2012/0166854 A1 * | 6/2012 | Rotem | ....................... | G06F 1/28 713/340 |
| 2012/0187991 A1 | 7/2012 | Sathe et al. | | |

(Continued)

OTHER PUBLICATIONS

PCT/US2015/055138, International Search Report and Written Opinion, Feb. 24, 2016, 14 pages.

*Primary Examiner* — Thomas Lee
*Assistant Examiner* — Mohammad A Rahman
(74) *Attorney, Agent, or Firm* — Stoel Rives LLP

(57) ABSTRACT

Systems, methods, and devices are disclosed for mitigating voltage droop in a computing device. An example apparatus includes a plurality of threshold registers to store respective voltage droop thresholds, and an interface to receive a license grant message indicating a license mode for a processor core or domain. The license mode corresponds to a selected set of execution units in the processor core or domain. The apparatus also includes a voltage droop correction module to, based on the license mode indicated in the license grant message, select one of the voltage droop thresholds from the plurality of voltage droop registers, and compare a voltage droop in the processor core or domain with the selected voltage droop threshold. Based on the comparison, the apparatus triggers a voltage droop correction process.

25 Claims, 7 Drawing Sheets

(56) References Cited

U.S. PATENT DOCUMENTS

| | | | |
|---|---|---|---|
| 2013/0318372 A1* | 11/2013 | Osborn | G06F 1/26 |
| | | | 713/320 |
| 2014/0082377 A1 | 3/2014 | Dinh et al. | |
| 2014/0082381 A1 | 3/2014 | Dinh et al. | |
| 2014/0208141 A1 | 7/2014 | Bhandaru et al. | |
| 2014/0317422 A1* | 10/2014 | Rosenzweig | G06F 1/3206 |
| | | | 713/300 |
| 2015/0185260 A1* | 7/2015 | Uan-Zo-Li | G01R 21/00 |
| | | | 324/76.11 |
| 2015/0249391 A1* | 9/2015 | Yang | H02M 3/33576 |
| | | | 363/21.01 |

* cited by examiner

SYSTEMS AND METHODS FOR CORE DROOP MITIGATION BASED ON LICENSE STATE

TECHNICAL FIELD

This disclosure generally relates to power management for processors, servers, and other computing devices.

BACKGROUND

Advances in semiconductor processing and logic design have permitted an increase in the amount of logic that may be present on integrated circuit devices. As a result, computer system configurations have evolved from multiple integrated circuits in a system to multiple hardware threads, multiple cores, multiple devices, and/or complete systems on an individual integrated circuit. As the density of integrated circuits has grown, the power requirements for computing systems (from embedded systems to servers) have also escalated.

Power and thermal management issues are considerations in designing computer-based systems. In the server domain, the cost of electricity drives the need for low power systems. In mobile systems, battery life and thermal limitations make these issues relevant. Optimizing a system for maximum performance at minimum power consumption is usually done using the operating system (OS) or system software to control hardware elements.

In server systems or other computer systems, the power supply is generally sized for full system configuration running power virus software with instructions configured to, when executed, reach a processor maximum power. The continuous development of more pointed viruses that quickly change current (i.e., di/dt viruses, where "di/dt" corresponds to a rate at which the current changes with time) for processor cores results in higher voltage droops on the power supply. This is becoming a problem on server cores where additional compute engines that process ever wider vector instructions to boost performance are being added every generation. The high power di/dt viruses can go from a low current to a high current in very few cycles. Further, the change of current happens within a small area of the core resulting in an area of high current density and larger voltage drop, as compared to other areas of the core. Larger voltage droops may result in loss of performance due to increased power since the core nominal voltage is raised to compensate for the droop. This power increase may be high because of a square relationship with voltage and may reduce performance of various components of the server.

BRIEF DESCRIPTION OF THE DRAWINGS

Arrangements and embodiments may be described in detail with reference to the following drawings, in which like reference numerals refer to like elements.

DETAILED DESCRIPTION OF EMBODIMENTS

Figure 1:
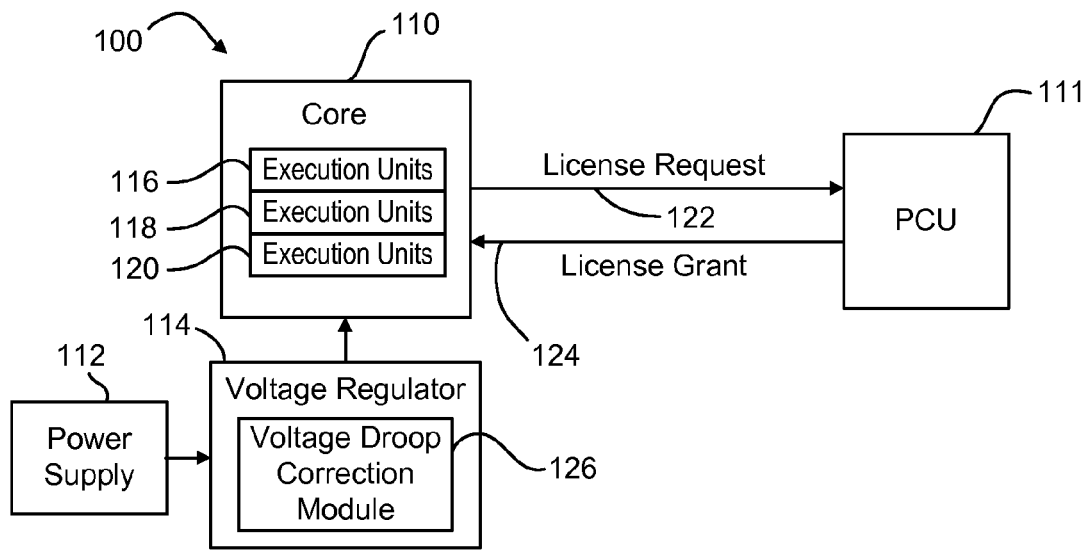
FIG. 1 is a block diagram of a portion of a system according to one embodiment.

A given voltage domain may have various levels of frequency or current requirements, and some of these requirements may be controlled via a license allocation from a power control unit. As discussed below, each license level may produce different levels of voltage droop in response to a di/dt virus. Certain embodiments disclosed herein select from a plurality of voltage droop thresholds based on a license mode corresponding to a selected set of execution units in a core or domain. The selected threshold is used to trigger a voltage droop correction process. Selecting the voltage droop threshold based on the license mode allows for a quicker response to droop events. In certain embodiments, the quicker response improves performance by lowering voltage droop, allows for reduced voltages and/or higher frequencies to be used, reduces the size and cost of voltage regulators, and/or reduces noise in the system.

For purposes of discussion herein, the embodiments described are with regard to voltage regulators for a computer system. While one such embodiment may be for purposes of a server computer system, the scope of the present disclosure is not limited in this regard and embodiments are highly scalable to enable solutions for many different types of computer systems, ranging from higher power systems such as server-based systems to low power systems such as portable computers such as laptop or Ultrabook™, tablet computers, smartphones, and other portable devices. Embodiments apply equally to systems having power requirements in between high power and low power systems such as desktop computers.

As discussed above, increasing the number of cores improves performance by, for example, allowing multi-threaded operation. Further, some core performance improvements come from increasing frequency. However, increasing frequency also increases power consumption. Thus, micro-architectural features may be added to the core to improve performance while allowing for higher frequencies. In certain processors, currents can change from an idle mode value to a high value may happen within very few cycles. For example, within three to four cycles the current may go from a low idle mode value to a maximum (or close to maximum) current value in certain areas of the core, which causes the voltage to droop.

Generally, the power supply cannot respond to the voltage drop fast enough. The problem may be mitigated with the addition of bulk output capacitors. However, bulk capacitors may only provide mitigation for slower droop events (e.g., thousands of nanoseconds at the board level or hundreds of nanoseconds at the package level) due to the impedance of the power delivery network. Further, using bulk capacitors is an expensive method of resolving the issue and the capacitors tend to run out of charge because of the number of cores that can simultaneously experience a voltage drop. Certain embodiments disclosed herein reduce the need for greater numbers of capacitors and total capacitance, such as bulk output capacitors, to provide for extra current capacity (delivery and/or absorption), again reducing the cost and size of a given solution. In other words, a voltage regulator according to certain embodiments may be cheaper, smaller, more power efficient, and may dissipate less temperature and power, thus enabling smaller systems.

FIG. 1 is a block diagram of a portion of a system 100 according to one embodiment. The system 100 includes a processor core 110, a power control unit (PCU) 111, a power supply 112, and a voltage regulator 114. The voltage regulator 114 may be located on a motherboard (e.g., with the power supply 112) or may be integrated with the core 110. The voltage regulator 114 is configured to receive a voltage from the power supply 112 and to provide a regulated voltage to the processor core 110. The processor core 110 includes a first set of execution units 116, a second set of execution units 118, and a third set of execution units 120. The execution units may include, for example, various integer, floating point, and single instruction multiple data (SIMD) logic units, among other specialized hardware. For example, such execution units may include one or more arithmetic logic units (ALUs), jump execution units, load execution units, store execution units, and other known execution units.

The processor core 110 is configured to operate in various license modes corresponding to the set or sets of execution units that may be used at a particular time and/or for a particular process. For example, in a low license mode, the processor core 110 is authorized by the PCU 111 to use only the first set of execution units 116. In a medium license mode, the processor core 110 may use both the first set of execution units 116 and the second set of execution units 118. In a high license mode, the processor core 110 may use the first set of execution units 116, the second set of execution units 118, and the third set of execution units 120. Persons skilled in the art will recognize from the disclosure herein that other license modes may be used with additional sets or other combinations of sets of execution units. In certain embodiments, for example, the processor core 110 may have only two license modes, while in other embodiments more than three license modes may be used.

In the low license mode, the first set of execution units 116 may provide the processor core 110 with only certain basic floating point operations. Certain software applications and benchmarks, for example, require minimal processing that allows power consumption to be reduced by gating off the second set of execution units 118 and the third set of execution units 120. Because using only the first set of execution units 120 consumes less power, the processor core 110 can run at a higher frequency. When the processor core 110 determines that additional functionality or execution units are needed (e.g., based on a new software application to process with wider vector instructions or data), the processor core 110 sends a license request message 122 to the PCU 111. At the same frequency, the new software application may cause the processor core 110 to exceed a thermal design power (TDP) limit. Thus, before granting the license, the PCU 111 may lower the frequency so as to not exceed the TDP limit. The PCU 111 then sends a license grant message 124 to the processor core 110, which may authorize the processor core 110 to change to either the medium license mode or the high license mode.

In the low license mode, the rate (di/dt) at which the current can change is smaller than the rate (di/dt) at which the current can change in the medium license mode. Similarly, in the medium license mode, the rate (di/dt) at which the current can change is smaller than the rate (di/dt) at which the current can change in the high license mode. Thus, the amount of voltage droop that can occur in the processor core 110 is different in each license mode. In certain embodiments, the system 100 selects a voltage droop threshold based on the license mode. If, for example, the processor core 110 is in the low license mode, the selected voltage droop threshold is lower than the voltage droop threshold in the medium license mode or the high license mode. Thus, the system 100 is more sensitive to the smaller voltage droops of the low license mode than it would be if the higher voltage droop thresholds of the medium license mode or high license threshold were always used.

In the example shown in FIG. 1, the voltage regulator 114 includes a voltage droop correction module 126 configured to mitigate the voltage droop detected in the processor core 110. The mitigation is triggered by exceeding the selected voltage droop threshold. Although shown as part of the voltage regulator 114, in other embodiments the voltage droop correction module 126 may be part of the PCU 111 or another component of the system 100. The voltage droop correction module 126 may be configured to provide any type of voltage droop mitigation scheme. For example, the voltage droop correction module 126 may include circuitry to provide additional current to the processor core 110. Other mitigation examples include, but are not limited to, clock gating and/or staggering logic activities.

Figure 2:
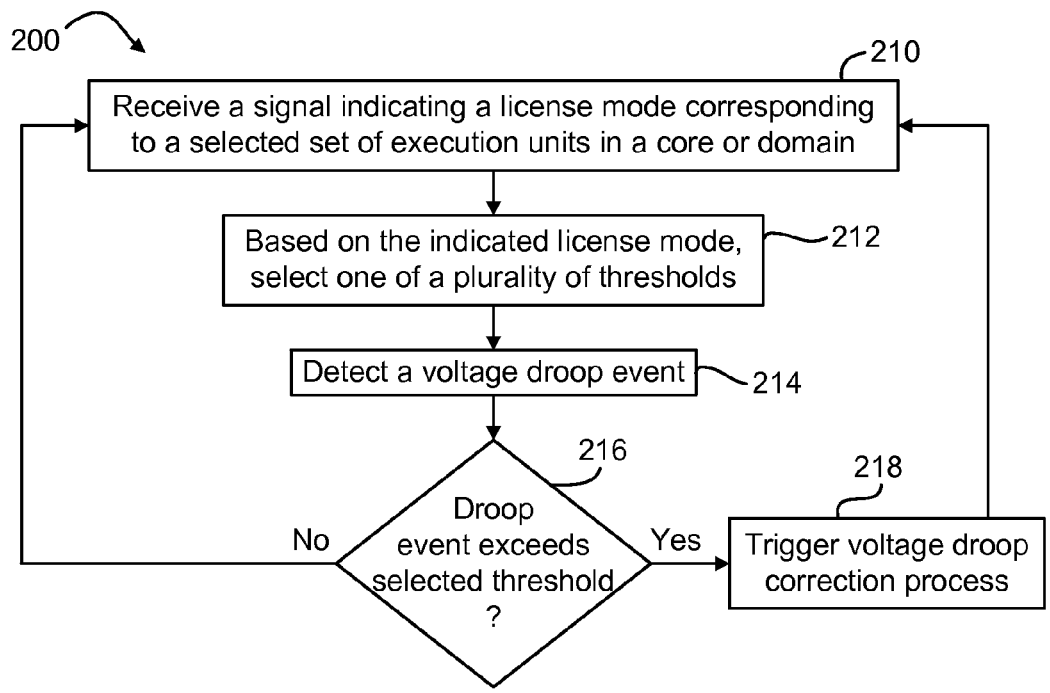
FIG. 2 is a flowchart of a method for mitigating voltage droop in a core or domain according to one embodiment.

FIG. 2 is a flowchart of a method 200 for mitigating voltage droop in a core or domain according to one embodiment. The method 200 may be performed by, for example, the system 100 shown in FIG. 1 or by other embodiments disclosed herein. The method 200 includes receiving 210 a signal indicating a license mode corresponding to a selected set of execution units in a core or domain. Based on the indicated license mode, the method 200 includes selecting 212 one of a plurality of thresholds. The method 200 further includes detecting 214 a voltage droop event in the core or domain, and determining 216 whether the detected droop event exceeds the selected threshold. If the droop event does not exceed the selected threshold, the method 200 repeats or continues to monitor for voltage droop events that exceed the selected threshold. If, however, the droop event exceeds the selected threshold, the method 200 includes triggering a voltage droop correction process. Again, the method 200 may then repeat or continue monitoring for voltage droop events.

Certain example embodiments discussed below use a fully integrated voltage regulator (FIVR) and non-linear control (NLC) to mitigate voltage droop in a core or domain. The introduction of FIVRs into computer systems has resulted in large di/dt current changes that may result in very high noise levels on the input supply of the FIVRs. The noise levels further impact performance of sensitive analog circuits in the FIVRs, as well as in other areas that are sharing the power supply. These noise problems have dramatically impacted server and other computer systems. The noise may be reduced, according to certain embodiments, by selecting a voltage droop threshold based on a license mode corresponding to a selected set of execution units in the core or domain.

Figure 3:
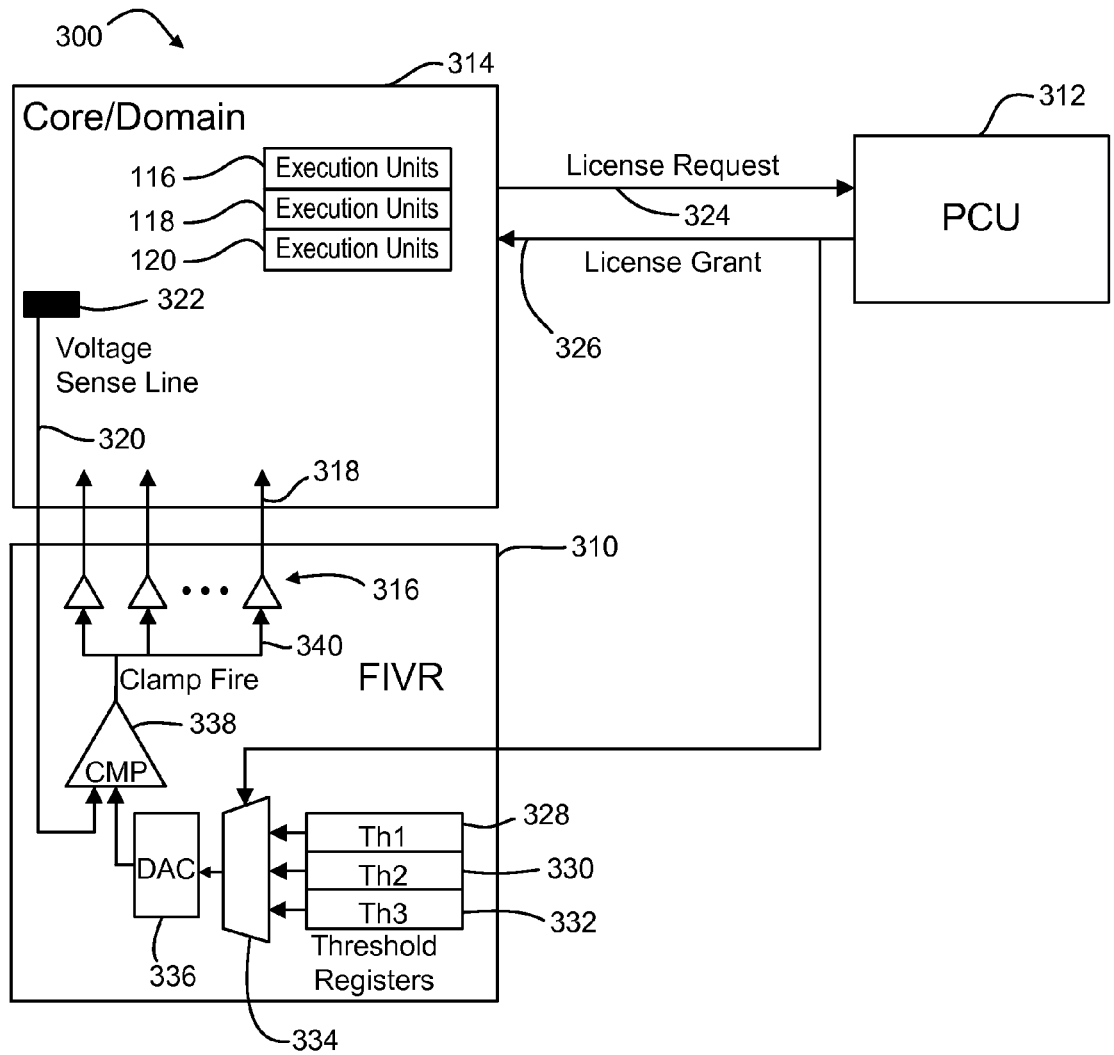
FIG. 3 is a block diagram of a portion of a system including a fully integrated voltage regulator (FIVR) according to one embodiment.

FIG. 3 is a block diagram of a portion of a system 300 including a FIVR 310 according to one embodiment. In addition to the FIVR 310, the system 300 includes a PCU 312, and a core and/or domain (core/domain) 314 of a processor. For clarity, other system components, such as the power supply coupled to the FIVR 310, are not shown. The core/domain 314 is configured to operate in various license modes corresponding to which set or sets of execution units are used. As discussed above with respect to FIG. 1, the core/domain 314 may include a first set of execution units 116, a second set of execution units 118, and a third set of execution units 120. In the low license mode, the core/domain 314 is authorized by the PCU 312 to use only the first set of execution units 116. In the medium license mode, the core/domain 314 may use both the first set of execution units 116 and the second set of execution units 118. In a high license mode, the core/domain 314 may use the first set of execution units 116, the second set of execution units 118, and the third set of execution units 120. Persons skilled in the art will recognize from the disclosure herein that other license modes may be used with additional sets or other combinations of sets of execution units. In certain embodiments, for example, the core/domain 314 may have only two license modes, while in other embodiments more than three license modes may be used.

The FIVR 310 is configured to provide a regulated voltage to the core/domain 314, and includes a main feedback loop (not shown) for responding to changes in current and voltage in the core/domain 314. The main feedback loop of the FIVR 310 may have a wide range of bandwidths for responding to power changes. However, effectively mitigating voltage droop caused by a di/dt virus, according to certain embodiments, may require a response time of less than about 2 nanoseconds. Thus, the main loop of the FIVR 310 in such embodiments may not be fast enough to respond to a di/dt virus driven droop. Also, the on-die decoupling capacitance of the power delivery network may not be sufficient to control the droop and can come at the cost of area (e.g., adding additional capacitance may add to the size and cost of the system 300). Further, mitigating voltage droop by increasing the switching bandwidth of the FIVR 310 may impact efficiency and stability. Off chip power delivery, e.g., using a motherboard voltage regulator (MBVR), may also have similar problems may be much slower to respond to fast voltage drops.

To speed up the response time, the FIVR 310 includes a plurality of current clamps 316 (three shown) that can fire once a certain voltage droop threshold is exceeded. The FIVR 310 is configured to provide non-linear control (NLC) to respond to the fast voltage droop by using the current clamps 316 to effectively bypass the FIVR's main loop to thereby speed up the direct delivery of current to one or more portions of the core/domain 314 associated with the voltage droop. In certain embodiments, the current clamps 316 comprise transistors powered by an input supply of the FIVR 310. For example, the current clamps 316 may each include a p-type metal-oxide-semiconductor (PMOS) transistor having source terminals electrically coupled to an external motherboard power supply (not shown) and drain terminals electrically coupled to respective locations in the core/domain 314 through respective current supply lines 318.

The system 300 includes a voltage sense line 320 coupled to an area 322 in the core/domain 314 that is likely to suffer a large, and possibly the largest, voltage drop. The voltage sense line 320 may comprise, for example, an electrically conductive metal. The current clamps 316 may be configured to trigger based on a set (e.g., predetermined) voltage droop threshold. Although using a predetermined threshold may be effective, certain implementations may use a one-size-fits-all solution that is targeted for a worst case di/dt virus in a high license mode. As discussed above, the threshold setting may be higher in the high license mode since the expected voltage drop is higher at this license level, as compared to the low or medium license levels. Prior solutions set the threshold based on the highest levels of droop, and hence the highest license mode, because setting the threshold lower may result in continuous or frequent firing of the current clamps 316, at least while operating in high license modes.

Over firing the current clamps 316 may produce large noise levels on the FIVR's input power supply because the current is directly drawn from the power supply without the usual inductor-capacitor (LC) filter configuration of the FIVR 310. Higher levels of noise can be produced when current clamps used for NLC are fired simultaneously, e.g., in a multi-core server chip. Noise on the input power supply may result in failure of FIVR circuits due to a minimum voltage (Vmin) violation and pass-through of noise to the FIVR output supply. Both of these effects may be detrimental to the operation of FIVRs. If clamps are used with a motherboard VR solution, noise generated on the supply due to the clamps can impact Vmin of surrounding circuits sharing this supply resulting in a power increase and circuit failure. Thus, it is useful to set the threshold to reduce or minimize the firing of the clamps. Tailoring the threshold to the license issued (proportional to the droop) to the core may results in just enough control to produce the required droop reduction in every state of the core. The use of license information does not need to be limited to threshold change, but can also be used to adjust the size or strength of the current clamps as well. This change of strength will also reduce the noise on the power supply of the clamps.

In the example shown in FIG. 3, the system 300 tailors the NLC process to work more effectively for the various license modes supported by the core/domain 314. The system 300 selectively adjusts the NLC threshold (i.e., the voltage droop threshold or point at which the non-linear control fires the current clamps 316 in response to a droop event) based on the license level of the core at a given time. The voltage droops expected in each of the license modes are highest in the high license mode (e.g., when all sets of execution units 116, 118, 120 are used), followed by the medium license mode (when the sets of execution units 116, 118 are used), which in turn is followed by the low execution mode (when the set of execution units 116 is used).

The license grant message 326 of the core/domain 314 is granted by the PCU 111 upon receiving a license request message 324 from the core/domain 314. In the illustrated embodiment, the license grant message 326 is also communicated to the FIVR 310 to dynamically change the voltage droop threshold. It should be noted that the embodiment shown FIG. 3 may be applied to any voltage domain that utilizes current clamps to control droop. Such domains may support selectable modes where each mode experiences different levels of voltage droop because of a differing level of current changes per unit time (either due to frequency, voltage or power changes). Further, since the clamp solution is independent of FIVR, the solution of the illustrated embodiment may also apply to any voltage regulator selected for the domain. In addition, or in other embodiments, the information related to the core license mode may be used to selectively adjust the strength of the clamps because lower voltage droops may use lower current as well. In other words, based on the license mode, the clamps may provide different current levels to the core/domain 314.

As shown in FIG. 3, the FIVR 310 further includes a first threshold register 328, a second threshold register 330, a third threshold register 332, a threshold selector module 334, a digital to analog converter (DAC) 336, and a comparator (CMP) 338. The three threshold registers in this example provide for three levels of licensing. However, those skilled in the art will recognize from the disclosure herein that additional or fewer registers and/or threshold values may also be used. The first threshold register 328 is configured to store a first threshold value (Th1), the second threshold register 330 is configured to store a second threshold value (Th2), and the third threshold register 332 is configured to store a third threshold value (Th3).

The threshold registers provide the threshold values Th1, Th2, Th3 to the threshold selection module 334. The threshold selection module 334 may include a multiplexer or other circuitry or computer executable instructions to select one of the threshold values Th1, Th2, Th3 based on the license grant message 326 from the PCU 312. The threshold selection module 334 is configured to select the first threshold value Th1 when the license grant message 326 indicates the low license mode, the second threshold value Th2 when the license grant message 326 indicates the medium license mode, and the third threshold value Th3 when the license grant message 326 indicates the high license mode. The threshold values Th1, Th2, Th3 and/or the output of the threshold selection module 334 may comprise digital data, which the digital to analog converter 336 converts to an analog threshold value provided to a first input of the comparator 338. A second input of the comparator 338 is electrically coupled to the voltage sense line from the core/domain 314. If the droop on the voltage sense line 320 drops below the analog threshold value, the comparator 338 outputs a clamp fire signal 340 to the current clamps 316. In response, the current clamps 316 turn on to drive current through the current supply lines 318 to the respective locations (e.g., particular execution units) in the core/domain 314 that are expected to experience the voltage droop. Turning on the current clamps effectively pulls up the voltage at the respective locations in the core/domain 314 back to a nominal voltage before the droop.

Figure 4A:
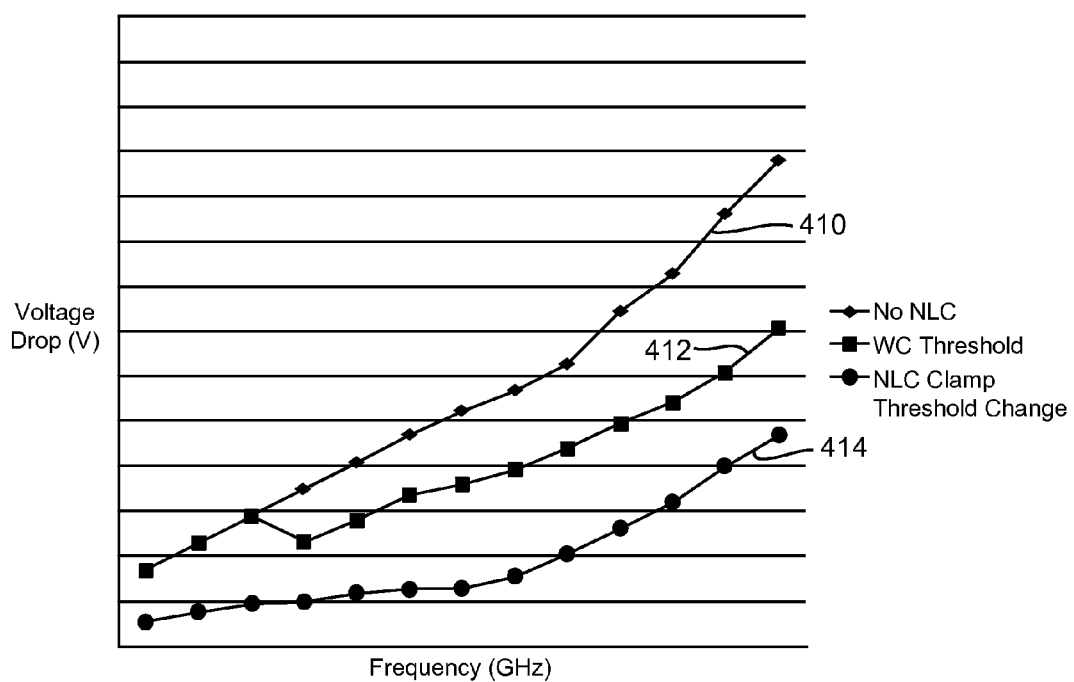
FIGS. 4A and 4B illustrate example graphs of voltage droop versus frequency of a core for two example license modes according to certain embodiments.
Figure 4B:
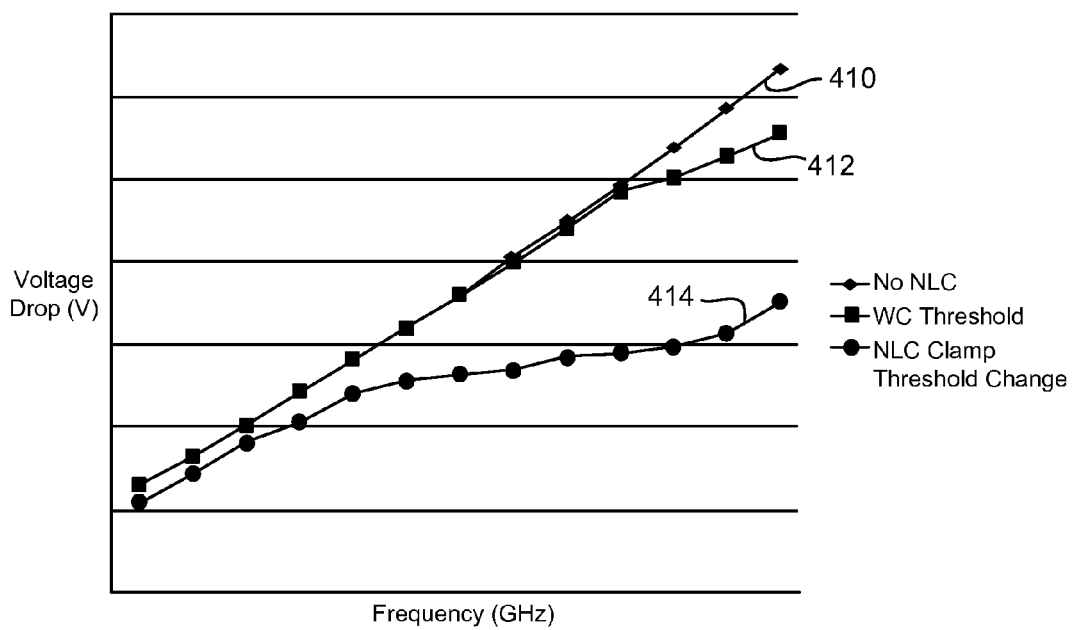

FIGS. 4A and 4B illustrate example graphs of voltage droop versus frequency of a core for two example license modes according to certain embodiments. In this example, the illustrated graphs are produced using a worst case (WC) core virus. FIGS. 4A and 4B each compare a first graph 410 corresponding to using no NLC (e.g., the NLC inactive such that no current clamps are used), a second graph 412 corresponding to using NLC current clamps with a set WC threshold based on a highest license mode voltage drop, and a third graph 414 corresponding to using NLC current clamps with threshold changed based on issued license to the core.

In FIG. 4A, a medium license level is used and a comparison of the first graph 410 to the second graph 412 clearly shows an improvement in voltage droop when NLC is used, as compared to when NLC is not used. As shown by the third graph 414, however, when the threshold is tailored to the license mode currently in operation there is a further improvement. In this example, it is assumed that the WC threshold corresponding to the second graph 412 represents a case where the threshold is set by a higher license mode than the medium license mode.

In FIG. 4B, a low license level is used. The first graph 410 and the second graph 412 in FIG. 4B are coincident or nearly coincident with each other for much of the frequency range, which indicates the ineffectiveness of NLC at the low license level when the WC threshold is used. In other words, for many frequencies, it is not useful to use a threshold that is designed for the highest license mode, rather than the currently selected license mode. The third graph 414 shown in FIG. 4B shows a dramatic improvement in voltage droop with the use of a threshold that is tailored for the low license level. In certain embodiments, improvement in voltage droop with the use of a threshold that is tailored for the selected license level may range from about 10 mV to about 40 mV.

Figure 5:
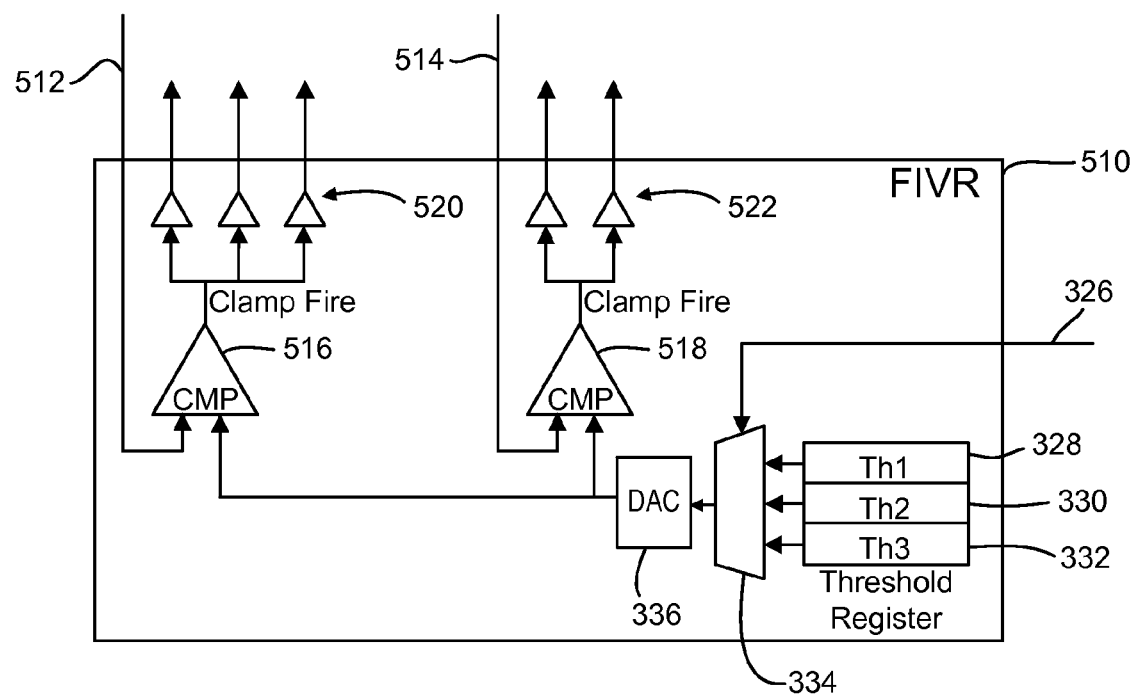
FIG. 5 is a block diagram of a FIVR coupled to a first voltage sense line and a second voltage sense line according to one embodiment.

Returning to FIG. 3, the illustrated example embodiment includes a single voltage sense line 320 and the FIVR 310 is configured to fire each of the current clamps 316 at the same time. In other embodiments, additional voltage sense lines may be used. For example, FIG. 5 is a block diagram of a FIVR 510 coupled to a first voltage sense line 512 and a second voltage sense line 514 according to one embodiment. The FIVR 510 includes the first threshold register 328, the second threshold register 330, the third threshold register 332, the threshold selector module 334, and the digital to analog converter (DAC) 336, as shown in FIG. 3.

However, the FIVR 510 shown in FIG. 5 includes a first comparator (CMP) 516 coupled to the first voltage sense line 512 and a second comparator 518 coupled to the second voltage sense line 514. The digital to analog converter is configured to provide the selected analog threshold value to as additional inputs to both the first comparator 516 and the second comparator 518. Based on the selected threshold and the input from the first voltage sense line 512, the first comparator 516 is configured to fire a first set of current clamps 520 (three shown) coupled to respective locations (e.g., particular execution units) in the core/domain. Similarly, based on the selected threshold and the input from the second voltage sense line 514, the second comparator 518 is configured to fire a second set of current clamps 522 (two shown) coupled to respective locations (e.g., particular execution units) in the core/domain. Thus, independent droop events may be detected and mitigated.

Figure 6:
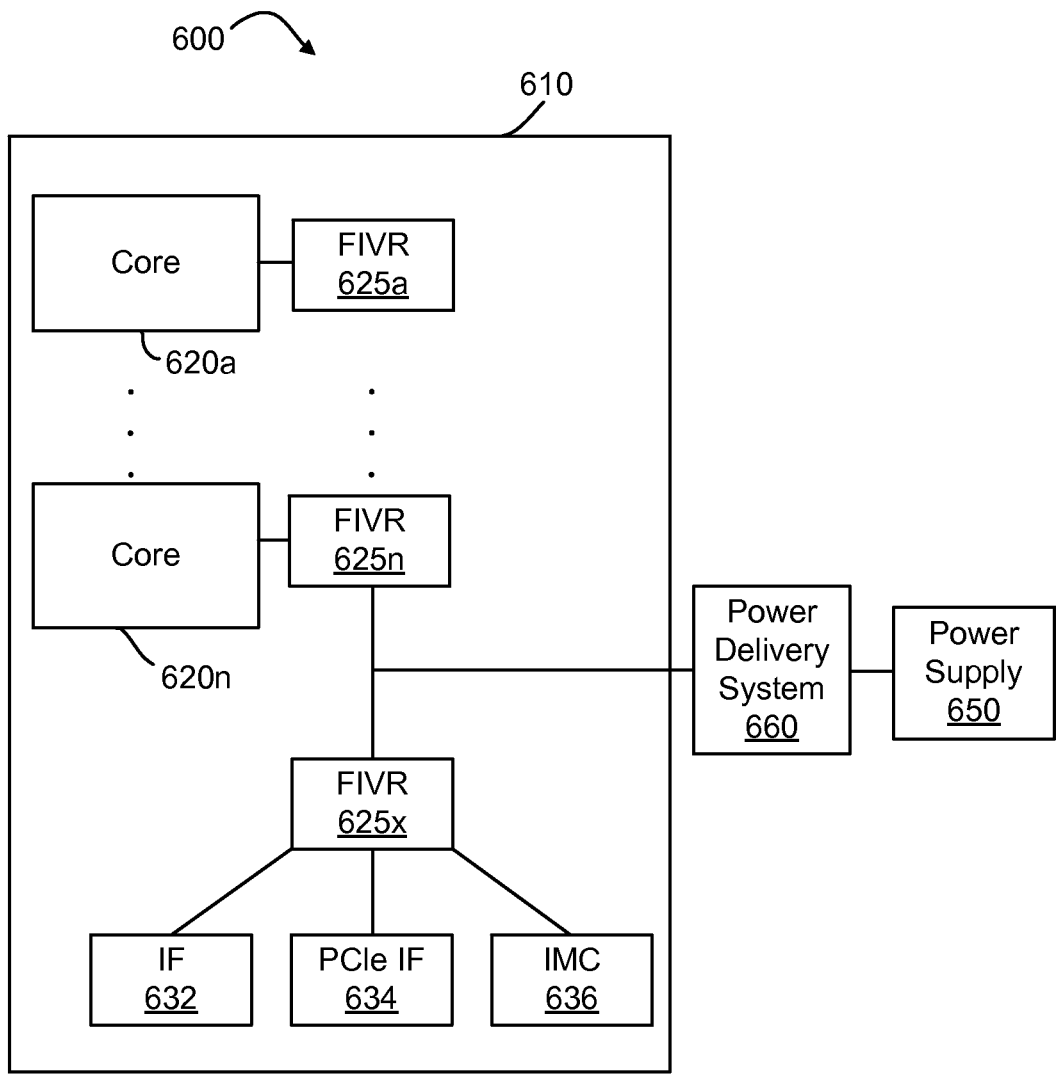
FIG. 6 is a block diagram of a portion of a system according to certain embodiments.

FIG. 6 is a block diagram of a portion of a system 600 according to certain embodiments. As shown in FIG. 6, the system 600 may include various components, including a processor 610, which as shown is a multicore processor. The processor 610 may be coupled to a power supply 650 via an external power delivery system 660. As shown, the processor 610 may be a single die processor including multiple cores 620a-620n. In addition, each core may be associated with an individual voltage regulator 625a-625n. Accordingly, a FIVR implementation may be provided to allow for fine-grained control of voltage and thus power and performance of each individual core. As such, each core can operate at an independent voltage and frequency, enabling great flexibility and affording wide opportunities for balancing power consumption with performance.

Further, each voltage regulator 625a-625n may comprise the FIVR 310 shown in FIG. 3 or the FIVR 510 shown in FIG. 5, and may be configured to select from a plurality of voltage droop thresholds based on a license mode corresponding to a selected set of execution units in its respective core. The power delivery system 660 may include a PCU or other components configured to receive individual license requests from the cores 620a-620n and to respond with license grants, which are also communicated to the corresponding voltage regulator 625a-625n to allow for independent voltage droop threshold selection in each core.

Figure 7:
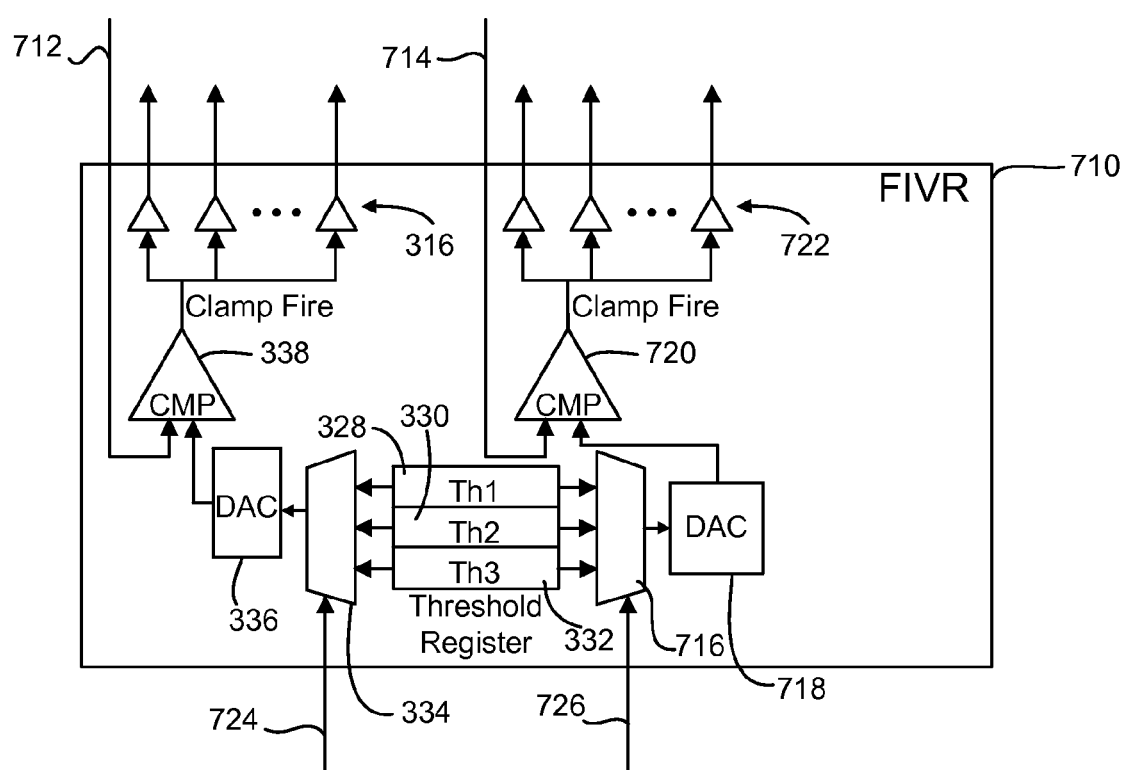
FIG. 7 is a block diagram of a FIVR coupled to a first voltage sense line and a second voltage sense line according to one embodiment.

In addition, or in other embodiments, a single voltage regulator may be configured to control two or more of the cores 620a-620n. For example, FIG. 7 is a block diagram of a FIVR 710 coupled to a first voltage sense line 712 of a first core and a second voltage sense line 714 of a second core according to one embodiment. The FIVR 710 includes the first threshold register 328, the second threshold register 330, the third threshold register 332, the threshold selector module 334, the digital to analog converter (DAC) 336, the comparator (CMP) 338, and the plurality of current clamps 316, as shown in FIG. 3. The outputs of the current clamps 316 may be coupled to respective locations (e.g., particular execution units) in the first core. The FIVR 710 also includes a second threshold selector module 716, a second digital to analog converter (DAC) 718, a second comparator (CMP) 720, and a second plurality of current clamps 722. The outputs of the second current clamps 722 may be coupled to respective locations (e.g., particular execution units) in the second core.

The threshold selector module 334 receives a first license grant message 724 corresponding to a license level granted to the first core. The threshold selector module 334 is configured to select a voltage droop threshold Th1, Th2, or Th3 based on the first license grant message 724. Similarly, the second threshold selector module 716 receives a second license grant message 726 corresponding to a license level granted to the second core. The second threshold selector module 716 is configured to select a voltage droop threshold Th1, Th2, or Th3 based on the second license grant message 726. Thus, different thresholds may be selected for each core such that independent droop events may be detected in each core and mitigated according to the embodiments disclosed herein.

Returning to FIG. 6, additional components may be present within the processor 610 including an input/output interface (IF) 632, another interface 634, and an integrated memory controller (IMC) 636. As shown, each of these components may be powered by another integrated voltage regulator 625x. In one embodiment, the interface 632 may be in accordance with the quick path interconnect (QPI) protocol, which provides for point-to-point (PtP) links in a cache coherent protocol that includes multiple layers including a physical layer, a link layer and a protocol layer. In turn, the interface 634 may be in accordance with a peripheral component interconnect express (PCIe™) specification.

and so forth. Furthermore, while shown in the implementation of FIG. 6 with an integrated voltage regulator, embodiments are not so limited.

Figure 8:
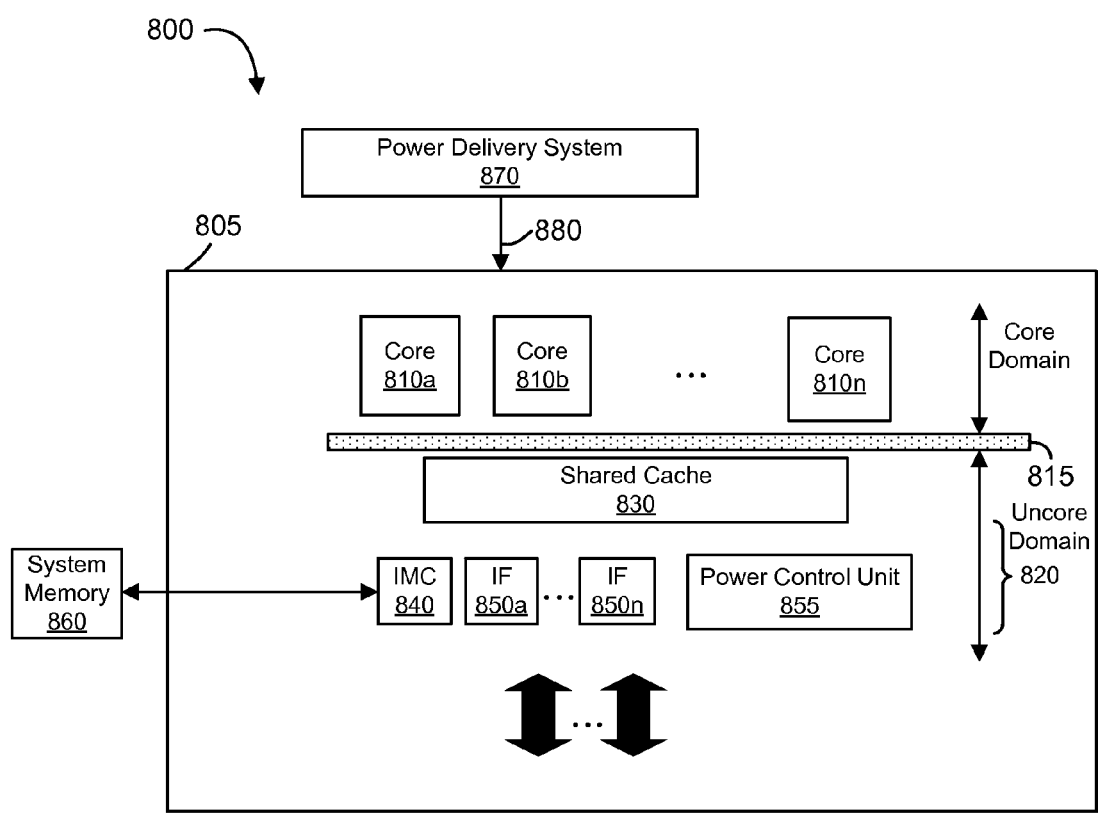
FIG. 8 is a block diagram of a system according to certain embodiments.

FIG. 8 is a block diagram of a system 800 according to certain embodiments. As shown in FIG. 8, the system 800 includes a processor 805, which may be a multicore processor having a plurality of cores 810a-810n of a core domain. In one embodiment, each such core may be of an independent power domain and may be configured to operate at an independent voltage and/or frequency. The various cores may be coupled via an interconnect 815 to a system agent or uncore domain 820 that includes various components. As seen, the uncore domain 820 may include a shared cache 830 that may be a last level cache. In addition, the uncore domain 820 may include an integrated memory controller 840, various interfaces 850, and a power control unit 855. A power delivery system 870 with voltage regulators, as described above, can couple to the processor 805 via a supply line 880. The power delivery system 870 may be configured to mitigate voltage droop based on a license mode granted for a particular core and/or uncore domain. The processor 805 may communicate with a system memory 860, e.g., via a memory bus. In addition, by interfaces 850, connection can be made to various off-package components such as peripheral devices, mass storage and so forth. While shown with this particular implementation in the embodiment of FIG. 8, the scope of the present invention is not limited in this regard.

In some embodiments, the change of the license is coupled with a different voltage and frequency as well. Thus, the license grant is deferred until a safe voltage and frequency is reached for that mode. The change of the voltage droop threshold may also be deferred to the time when the license is granted. In certain embodiments, however, there is no requirement that the license grant is synchronized with the threshold change. This is illustrated in Table 1.

TABLE 1

| Transition Type | Step 1 | Step 2 | Step 3 | Step 4 |
|---|---|---|---|---|
| Low level to medium level - Type A | Safe voltage & frequency for medium level | Core starts medium level earlier than FIVR threshold change | Until threshold changes to medium level, NLC may fire more | FIVR changes threshold to medium level |
| Low level to medium level - Type B | Safe voltage & frequency for medium level | FIVR changes threshold earlier than core change | Safe voltage/frequency permits higher threshold (e.g., for medium level) while core still in low level | Core moves to medium level |
| Medium level to low level - Type A | Safe voltage & frequency for low level | Core starts low level earlier than FIVR threshold change | Safe voltage/frequency permits higher threshold (e.g., medium level) while core in low level | FIVR changes threshold to low level |
| Medium level to low level - Type B | Safe voltage & frequency for low level | FIVR changes threshold earlier than core change | With threshold at low level, NLC may fire more | Core moves to low level |

While not shown for ease of illustration, it should be understood that additional components may be present within the processor 610 such as uncore logic, a power control unit, and other components such as internal memories, e.g., one or more levels of a cache memory hierarchy In the example of Table 1, the type A event is when the license grant to the core takes effect sooner than the threshold change, while the type B event is when the threshold change takes effect earlier than license grant. Step 3 shows how the current clamps may behave and function in either transition. As shown, excessive voltage droop is not experienced in either type of transition.

Example Embodiments

The following examples pertain to further embodiments.

Example 1 is an apparatus that includes a plurality of threshold registers, a interface, and a voltage droop correction module. The plurality of threshold registers are configured to store respective voltage droop thresholds. The interface is configured to receive a license grant message indicating a license mode for a processor core or domain, the license mode corresponding to a selected set of execution units in the processor core or domain. The voltage droop correction module is configured to, based on the license mode indicated in the license grant message, select one of the voltage droop thresholds from the plurality of voltage droop registers. The voltage droop correction module is configured to compare a voltage droop in the processor core or domain with the selected voltage droop threshold. The voltage droop correction module is configured to, based on the comparison, trigger a voltage droop correction process.

In Example 2, the apparatus of Example 1 further includes a voltage regulator to couple a regulated voltage to a device including the processor core or domain.

In Example 3, the voltage regulator of Example 2 is coupled to a motherboard.

In Example 4, the voltage regulator of any of Examples 1-2 includes a FIVR integrated with the device including the processor core or domain.

In Example 5, the interface of any of Examples 1-3 receives the license grant message from a PCU.

In Example 6, the voltage droop correction process of any of Examples 1-4 includes a non-linear control process to provide excess current to the processor core or domain via one or more current supply lines.

In Example 7, the voltage droop correction module of Example 6 further includes one or more current clamps configured to provide the excess current to the one or more current supply lines in response to the trigger.

In Example 8, the voltage droop correction module of Example 7 further includes a threshold selector module coupled to the plurality of threshold register, the threshold selector module configured to, based on the license mode indicated in the license grant message, select one of the voltage droop thresholds from the plurality of voltage droop registers. The voltage droop correction module further includes a voltage sense line coupled to an area of the processor core or domain expected to experience the voltage droop. The voltage droop correction module further includes a comparator to compare a sensed voltage droop on the voltage sense line to the selected voltage droop threshold to detect a droop event, and to fire the one or more current clamps in response to the detected droop event.

In Example 9, the voltage sense line of Example 8 includes a first voltage sense line, the area of the processor core or domain includes a first area of the processor core or domain, the comparator includes a first comparator, the sensed voltage droop includes a first sensed voltage droop, and the droop event includes a first droop event. The voltage droop correction module further includes a second voltage sense line coupled to a second area of the processor core or domain expected to experience the voltage droop. The voltage group correction module further includes a second comparator to compare a second sensed voltage droop on the second voltage sense line to the selected voltage droop threshold to detect a second droop event, and to fire the one or more current clamps in response to the detected second droop event.

In Example 10, the voltage droop correction module of any of Examples 8-9 further includes a digital to analog converter coupled between the threshold selector module and the comparator. The selected voltage droop threshold includes a digital value, and the digital to analog converter is configured to convert the digital value to an analog threshold signal and to provide the analog threshold signal to an input of the comparator.

In Example 11, the voltage droop correction module of any of Examples 7-10 is configured to adjust a strength of the one or more current clamps based on the license mode indicated in the license grant message.

Example 12 is a method that includes receiving, at a voltage regulator, a signal indicating a license mode corresponding to a selected set of execution units in a core or domain of a processor. The method includes selecting, based on the indicated license mode, one of a plurality of thresholds. The method includes detecting a voltage droop event in the core or domain of the processor. The method includes determining that the voltage droop event exceeds the selected threshold. The method includes triggering, in response to the determination, a voltage droop correction process.

In Example 13, the voltage droop correction process of Example 12 includes a non-linear control process including providing excess current to the processor core or domain via one or more current supply lines.

In Example 14, triggering the voltage droop correction process in Example 13 includes triggering one or more current clamps configured to provide the excess current to the one or more current supply lines.

In Example 15, the method of Example 14 further includes adjusting a strength of the one or more current clamps based on the license mode indicated in the license grant message.

In Example 16, triggering the voltage droop correction process of any of Examples 13-15 includes adjusting, based on the license mode indicated in the license grant message, a strength of one or more current clamps configured to provide the excess current.

In Example 17, detecting the voltage droop event in any of Examples 12-16 includes receiving a signal from a voltage sense line coupled to an area of the processor core or domain expected to experience the voltage droop.

Example 18 is at least one computer-readable storage medium having stored thereon instructions that, when executed by a processor, cause the processor to perform operations. The operations include receiving a signal indicating a license mode corresponding to a selected set of execution units in a core or domain. The operations include selecting, based on the indicated license mode, one of a plurality of thresholds. The operations include detecting a voltage droop event in the core or domain. The operations include determining that the voltage droop event exceeds the selected threshold. The operations include triggering, in response to the determination, a voltage droop correction process.

In Examples 19, the voltage droop correction process of Example 19 includes a non-linear control process including providing excess current to the processor core or domain via one or more current supply lines.

In Example 20, triggering the voltage droop correction process of Example 19 includes triggering one or more current clamps configured to provide the excess current to the one or more current supply lines.

In Example 21, the operations of Examples 20 further include adjusting a strength of the one or more current clamps based on the license mode indicated in the license grant message.

In Example 22, the triggering the voltage droop correction process in any of Examples 19-22 includes adjusting, based on the license mode indicated in the license grant message, a strength of one or more current clamps configured to provide the excess current.

Example 23 is a processor comprising that includes a plurality of cores each to independently execute instructions and to operate at independent voltages and frequencies. The processor includes one or more integrated voltage regulators to provide the independent voltages and frequencies to the plurality of cores, wherein each of the one or more voltage regulators comprises a storage device, an interface, and a voltage droop correction module. The storage device is configured to store a plurality of voltage droop thresholds. The interface is configured to receive, from a power control unit, a license grant message indicating a license mode for corresponding core of the plurality of cores, the license mode corresponding to a selected set of execution units. The voltage droop correction module is configured to, based on the license mode indicated in the license grant message, select one of the plurality of voltage droop thresholds. The voltage droop correction module is configured to compare a voltage droop in the corresponding core with the selected voltage droop threshold. The voltage droop correction module is configured to trigger, based on the comparison, a voltage droop correction process.

In Example 24, the voltage droop correction process in Example 23 includes a non-linear control process to provide excess current to the corresponding core via one or more current supply lines.

In Examples 25, the voltage droop correction module of Example 23 further includes one or more current clamps configured to provide the excess current to the one or more current supply lines in response to the trigger.

In Example 26, the voltage droop correction module of Example 24 further includes a threshold selector module, a voltage sense line, and a comparator. The threshold selector module is configured to, based on the license mode indicated in the license grant message, select one of the plurality of voltage droop thresholds. The voltage sense line is coupled to an area of the corresponding core expected to experience the voltage droop. The comparator is configured to compare a sensed voltage droop on the voltage sense line to the selected voltage droop threshold to detect a droop event, and to fire the one or more current clamps in response to the detected droop event.

Example 27 is a method that includes storing respective voltage droop thresholds in a plurality of threshold registers. The method includes receiving a license grant message indicating a license mode for a processor core or domain, the license mode corresponding to a selected set of execution units in the processor core or domain. The method includes selecting, based on the license mode indicated in the license grant message, one of the voltage droop thresholds from the plurality of voltage droop registers. The method includes comparing a voltage droop in the processor core or domain with the selected voltage droop threshold. The method includes triggering, based on the comparison, a voltage droop correction process.

Example 28 is an apparatus including means to perform the method of any of Examples 12-17 and 27.

Example 29 is a machine readable storage including machine-readable instructions to implement the method or realize the apparatus of any of Examples 12-17 and 27-28.

The above description provides numerous specific details for a thorough understanding of the embodiments described herein. However, those of skill in the art will recognize that one or more of the specific details may be omitted, or other methods, components, or materials may be used. In some cases, well-known features, structures, or operations are not shown or described in detail.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Various embodiments may be implemented using hardware elements, software elements, and/or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art. The scope of the present invention should, therefore, be determined only by the following claims.

The invention claimed is:

1. An apparatus comprising:
 a plurality of threshold registers to store respective voltage droop thresholds, each voltage droop threshold stored in the threshold registers corresponding to a unique license mode of a processor core or domain;
 an interface to receive a license grant message indicating a license mode for the processor core or domain, the license mode corresponding to a selected set of execution units in the processor core or domain;
 a voltage droop correction module comprising:
  a threshold selector module coupled to the plurality of threshold registers, the threshold selector module configured to, based on the license mode indicated in the license grant message, select one of the voltage droop thresholds from the plurality of threshold registers;
  a voltage sense line coupled to an area of the processor core or domain expected to experience the voltage droop; and
  a comparator to compare a sensed voltage droop on the voltage sense line with the selected voltage droop threshold,
  wherein based on the comparison, the voltage droop correction module is configured to trigger a voltage droop correction process.

2. The apparatus of claim 1, further comprising a voltage regulator to couple a regulated voltage to a device including the processor core or domain.

3. The apparatus of claim 2, wherein the voltage regulator is coupled to a motherboard.

4. The apparatus of claim 2, wherein the voltage regulator comprises a fully integrated voltage regulator (FIVR) integrated with the device including the processor core or domain.

5. The apparatus of claim 1, wherein the interface receives the license grant message from a power control unit (PCU).

6. The apparatus of claim 1, wherein the voltage droop correction process comprises a non-linear control process to provide excess current to the processor core or domain via one or more current supply lines.

7. The apparatus of claim 6, wherein the voltage droop correction module further comprises one or more current clamps configured to provide the excess current to the one or more current supply lines in response to the trigger.

8. The apparatus of claim 7, wherein the voltage sense line comprises a first voltage sense line, the area of the processor core or domain comprises a first area of the processor core or domain, the comparator comprises a first comparator, the sensed voltage droop comprises a first sensed voltage droop, and the droop event comprises a first droop event, wherein the voltage droop correction module further comprises:
 a second voltage sense line coupled to a second area of the processor core or domain expected to experience the voltage droop; and
 a second comparator to compare a second sensed voltage droop on the second voltage sense line to the selected voltage droop threshold to detect a second droop event, and to fire the one or more current clamps in response to the detected second droop event.

9. The apparatus of claim 7, wherein the voltage droop correction module further comprises a digital to analog converter coupled between the threshold selector module and the comparator, wherein the selected voltage droop threshold comprises a digital value, and wherein the digital to analog converter is configured to convert the digital value to an analog threshold signal and to provide the analog threshold signal to an input of the comparator.

10. The apparatus of claim 7, wherein the voltage droop correction module is configured to adjust a strength of the one or more current clamps based on the license mode indicated in the license grant message.

11. A method comprising:
 receiving, at a voltage regulator, a signal indicating a license mode corresponding to a selected set of execution units in a core or domain of a processor;
 based on the indicated license mode, selecting, via a threshold selector module, one of a plurality of thresholds stored in a plurality of threshold registers coupled to the threshold selector module, each of the thresholds corresponding to a unique license mode of the core or domain of a processor;
 detecting a voltage droop event in the core or domain of the processor via a voltage sense line coupled to an area of the core or domain expected to experience the voltage droop;
 determining, via a comparator, that the voltage droop event exceeds the selected threshold; and
 in response to the determination, triggering, via a voltage droop correction module, a voltage droop correction process.

12. The method of claim 11, wherein the voltage droop correction process comprises a non-linear control process including providing excess current to the processor core or domain via one or more current supply lines.

13. The method of claim 12, wherein triggering the voltage droop correction process comprises triggering one or more current clamps configured to provide the excess current to the one or more current supply lines.

14. The method of claim 13, further comprising adjusting a strength of the one or more current clamps based on the license mode indicated in the license grant message.

15. The method of claim 12, wherein triggering the voltage droop correction process comprises adjusting, based on the license mode indicated in the license grant message, a strength of one or more current clamps configured to provide the excess current.

16. The method of claim 11, wherein detecting the voltage droop event comprises receiving a signal from a voltage sense line coupled to an area of the processor core or domain expected to experience the voltage droop.

17. At least one non-transitory computer-readable storage medium having stored thereon instructions that, when executed by a processor, cause the processor to perform operations comprising:
- receiving a signal indicating a license mode corresponding to a selected set of execution units in a core or domain;
- based on the indicated license mode, selecting one of a plurality of thresholds for the selected set of execution units from a plurality of threshold registers, each of the thresholds corresponding to a unique license mode of the core or domain of a processor;
- detecting a voltage droop event in the core or domain based on a signal from a voltage sense line coupled to an area of the core or domain expected to experience the voltage droop;
- determining that the voltage droop event detected based on the signal from the voltage sense line exceeds the selected threshold; and
- in response to the determination, triggering a voltage droop correction module to execute a voltage droop correction process.

18. The at least one non-transitory computer-readable storage medium of claim 17, wherein the voltage droop correction process comprises a non-linear control process including providing excess current to the processor core or domain via one or more current supply lines.

19. The at least one non-transitory computer-readable storage medium of claim 18, wherein triggering the voltage droop correction process comprises triggering one or more current clamps configured to provide the excess current to the one or more current supply lines.

20. The at least one non-transitory computer-readable storage medium of claim 19, further comprising adjusting a strength of the one or more current clamps based on the license mode indicated in the license grant message.

21. The at least one non-transitory computer-readable storage medium of claim 18, wherein triggering the voltage droop correction process comprises adjusting, based on the license mode indicated in the license grant message, a strength of one or more current clamps configured to provide the excess current.

22. A processor comprising:
- a plurality of cores each to independently execute instructions and to operate at independent voltages and frequencies; and
- one or more integrated voltage regulators to provide the independent voltages and frequencies to the plurality of cores, wherein each of the one or more voltage regulators comprises:
  - a storage device to store a plurality of voltage droop thresholds, each voltage droop threshold corresponding to a unique license mode of the plurality of cores;
  - an interface to receive, from a power control unit, a license grant message indicating a license mode for corresponding core of the plurality of cores, the license mode corresponding to a selected set of execution units; and
  - a voltage droop correction module comprising:
    - a threshold selector module to, based on the license mode indicated in the license grant message, select one of the plurality of voltage droop thresholds;
    - a voltage sense line coupled to an area of the corresponding core expected to experience the voltage droop; and
    - a comparator to compare a sensed voltage droop on the voltage sense line voltage droop in the corresponding core with the selected voltage droop threshold,
    - wherein based on the comparison, the voltage droop correction module is configured to trigger a voltage droop correction process.

23. The processor of claim 22, wherein the voltage droop correction process comprises a non-linear control process to provide excess current to the corresponding core via one or more current supply lines.

24. The apparatus of claim 7, wherein the voltage droop fires the one or more current clamps in response to the detected droop event.

25. The processor of claim 23, wherein the voltage droop correction module further comprises:
- one or more current clamps configured to provide the excess current to the one or more current supply lines in response to the trigger.

* * * * *